United States Patent
von Bochmann et al.

(10) Patent No.: US 10,078,698 B2
(45) Date of Patent: Sep. 18, 2018

(54) IDENTIFYING CLIENT STATES

(71) Applicant: International Business Machines Corporation, Armonk, NY (US)

(72) Inventors: Gregor von Bochmann, Ottawa (CA); Paul Ionescu, Kanata (CA); Guy-Vincent Jourdan, Ottawa (CA); Seyed Ali Moosavi Byooki, Ottawa (CA); Iosif V. Onut, Ottawa (CA); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 14/894,061

(22) PCT Filed: Apr. 15, 2014

(86) PCT No.: PCT/CA2014/050378
§ 371 (c)(1),
(2) Date: Nov. 25, 2015

(87) PCT Pub. No.: WO2014/190427
PCT Pub. Date: Dec. 4, 2014

(65) Prior Publication Data
US 2016/0110455 A1    Apr. 21, 2016

(30) Foreign Application Priority Data
May 28, 2013  (CA) .................... 2816781

(51) Int. Cl.
*G06F 17/30* (2006.01)
*G06F 17/22* (2006.01)

(52) U.S. Cl.
CPC .... *G06F 17/30864* (2013.01); *G06F 17/2247* (2013.01); *G06F 17/30327* (2013.01);
(Continued)

(58) Field of Classification Search
CPC .......... G06F 17/30864; G06F 17/2247; G06F 17/30327; G06F 17/30896; G06F 17/30905; G06F 17/30908
(Continued)

(56) References Cited

U.S. PATENT DOCUMENTS 8,280,884 B2   10/2012  Greenfield et al.
8,381,094 B1 *  2/2013  Prasad .............. G06F 17/30861
                                                         709/203
(Continued)

FOREIGN PATENT DOCUMENTS

CA   2816781 A1   11/2014
EP   1016988 A2    7/2000
WO   2014190427 A1 12/2014

OTHER PUBLICATIONS

Jourdan et al., "Solving Some Modeling Challenges when Testing Rich Internet Applications for Security," SECTEST 2012, The Third International Workshop on Security Testing, Apr. 12, 2012, 29 pages.
(Continued)

*Primary Examiner* — James K Trujillo
*Assistant Examiner* — Jessica N Le
(74) *Attorney, Agent, or Firm* — Nicholas D. Bowman

(57) ABSTRACT

A method for identifying client states, receives a set of paths representative of a document object model (DOM) associated with a web page of a rich internet application and for each path in the set of paths received, extracts a subtree, as subtree X, for a current path. The method traverses all known sub-paths under the current path and delete corresponding subtrees from subtree X and reads contents of and determines states of subtree X to form a state X. The state X is added to a set of current states and responsive to a
(Continued)

determination no more paths exist, returns the set of current states of the rich internet application.

17 Claims, 11 Drawing Sheets

(52) U.S. Cl.
CPC .. *G06F 17/30896* (2013.01); *G06F 17/30905* (2013.01); *G06F 17/30908* (2013.01)
(58) Field of Classification Search
USPC .......................................................... 707/709
See application file for complete search history.

(56) References Cited

U.S. PATENT DOCUMENTS

| | | | |
|---|---|---|---|
| 8,413,046 | B1 | 4/2013 | Mocanu |
| 9,053,206 | B2* | 6/2015 | Cai .................... G06F 17/30908 |
| 2005/0055343 | A1* | 3/2005 | Krishnamurthy ... G06F 17/3061 |
| 2005/0203957 | A1* | 9/2005 | Wang ................ G06F 17/30917 |
| 2007/0226206 | A1 | 9/2007 | Pavlovski et al. |
| 2008/0016087 | A1 | 1/2008 | Zhang et al. |
| 2010/0030752 | A1 | 2/2010 | Goldentouch |
| 2010/0088668 | A1* | 4/2010 | Yoshihama ............... G06F 8/10 717/105 |
| 2012/0059859 | A1 | 3/2012 | Jiao et al. |
| 2012/0109931 | A1 | 5/2012 | Prasad |
| 2012/0173966 | A1 | 7/2012 | Powell et al. |
| 2012/0198351 | A1 | 8/2012 | Lee et al. |
| 2012/0278699 | A1 | 11/2012 | Benjamin et al. |
| 2013/0014002 | A1 | 1/2013 | Cai et al. |

OTHER PUBLICATIONS

Choudhary et al., "Crawling Rich Internet Applications: The Sate of the Art," CASCON '12: Proceedings of the 2012 Conference of the Center for Advanced Studies on Collaborative Research, Nov. 2012, 15 pages, IBM Corp.
Anonymous, "A method of displaying the results of a rich internet application by a search engine," IP.com Prior Art Database Technical Disclosure, IP.com No. 000216730, http://ip.com/IPCOM/000216730.
Dincturk et al., "A Statistical Approach for Efficient Crawling of Rich Internet Applications," ICWE '12: Proceedings of the 12th International Conference on Web Engineering, Jul. 2012, 8 pages, Springer-Verlag.
Benjamin, K., "A Strategy for Efficient Crawling of Rich Internet Applications," Master's Thesis, University of Ottawa, 2012, 136 pages.
Bau et al., "State of the Art: Automated Black-Box Web Application Vulnerability Testing," 2010 IEEE Symposium on Security and Privacy (SP), 2010, pp. 332-345. DOI: 10.1109/SP.2010.27.
Olston et al., "Web Crawling," Foundations and Trends in Information Retrieval, vol. 4, No. 3, 2010, pp. 175-246. DOI: 10.1561/1500000017.
Benjamin et al., "A Strategy for Efficient Crawling of Rich Internet Applications," ICWE '11: Proceedings of the 11th International Conference on Web Engineering, Jun. 2011, 15 pages, Springer-Verlag.
Duda et al., "AJAXSearch: Crawling, Indexing and Searching Web 2.0 Applications," Proceedings of the VLDB Endowment, vol. 1, Issue 2, Aug. 2008, pp. 1440-1443, VLDB Endowment.
Duda et al., "AJAX Crawl: Making AJAX Applications Searchable," ICDE '09: IEEE 25th International Conference on Data Engineering, 2009, pp. 78-89. DOI: 10.1109/ICDE.2009.90.
Mesbah et al., "Exposing the Hidden-web Induced by Ajax," Delft University of Technology, Software Engineering Research Group, Technical Report Series, TUD-SERG-2008-001, 2008, 14 pages.
Roest et al., "Regression Testing Ajax Applications: Coping with Dynamism," 2010 Third International Conference on Software Testing, Verification and Validation (ICST), 2010, pp. 127-136. DOI: 10.1109/ICST.2010.59.
Bezemer et al., "Automated Security Testing of Web Widget Interactions," ESEC/FSE '09: Proceedings of the 7th joint meeting of the European Software Engineering Conference and the ACM SIGSOFT Symposium on the Foundations of Software Engineering on European Software Engineering Conference and Foundations of Software Symposium, Aug. 2009, pp. 81-90.
Mesbah et al., "Invariant-Based Automatic Testing of Ajax User Interfaces," ICSE 2009, IEEE 31st International Conference on Software Engineering, 2009, pp. 210-220. DOI: 10.1109/ICSE.2009.5070522.
Mesbah et al., "Crawling AJAX by Inferring User Interface State Changes," ICWE '08: Eigth International Conference on Web Engineering, 2008, pp. 122-134. DOI: 10.1109/ICWE.2008.24.
Frey, G., "Indexing AJAX Web Applications," Master's Thesis, ETH Zurich, Nov. 30, 2007, pp. 1-64.
Amalfitano et al., "Reverse Engineering Finite State Machines from Rich Internet Applications," WCRE '08: 15th Working Conference on Reverse Engineering, 2008, pp. 69-73. DOI: 10.1109/WCPE.2008.17.
Amalfitano et al., "An Iterative Approach for the Reverse Engineering of Rich Internet Application User Interfaces," 2010 Fifth International Conference on Internet and Web Applications and Services (ICIW), 2010, pp. 401-410. DOI: 10.1109/ICIW.2010.67.
Amalfitano et al., "DynaRIA: a Tool for Ajax Web Application Comprehension," 2010 IEEE 18th International Conference on Program Comprehension (ICPC), 2010, pp. 46-47. DOI: 10.1109?ICPC.2010.16.
Marchetto et al., "State-Based Testing of Ajax Web Applications," 2008 First International Conference on Software Testing, Verification, and Validation, 2008, pp. 121-130. DOI: 10.1109/ICST.2008.22.
Peng et al., "Graph-based AJAX Crawl: Mining Data From Rich Internet Applications," 2012 International Conference on Computer Science and Electronics Engineering (ICCSEE), 2012, vol. 3, pp. 590-594. DOI: 10.1109/ICCSEE.2012.38.
Mesbah et al., "Crawling AJAX-Based Web Applications through Dynamic Analysis of User Interface State Changes," Transactions on the Web (TWEB), 2012, pp. 1-30, vol. 6, Issue 1, ACM. DOI: 10.. 145/2109205.2109208.
Benjamin et al., "Some Modeling Challenges when Testing Rich Internet Applications for Security," First International Workshop on Modeling and Detection of Vulnerabilities (MDV), 2010 International Conference on Software Testing, Verification, and Validation Workshops (ICSTW), 2010, pp. 403-409.
International Search Report and Written Opinion (PCT) dated Aug. 12, 2014 for International Application PCT/CA2014/050378, 8 pages.

* cited by examiner

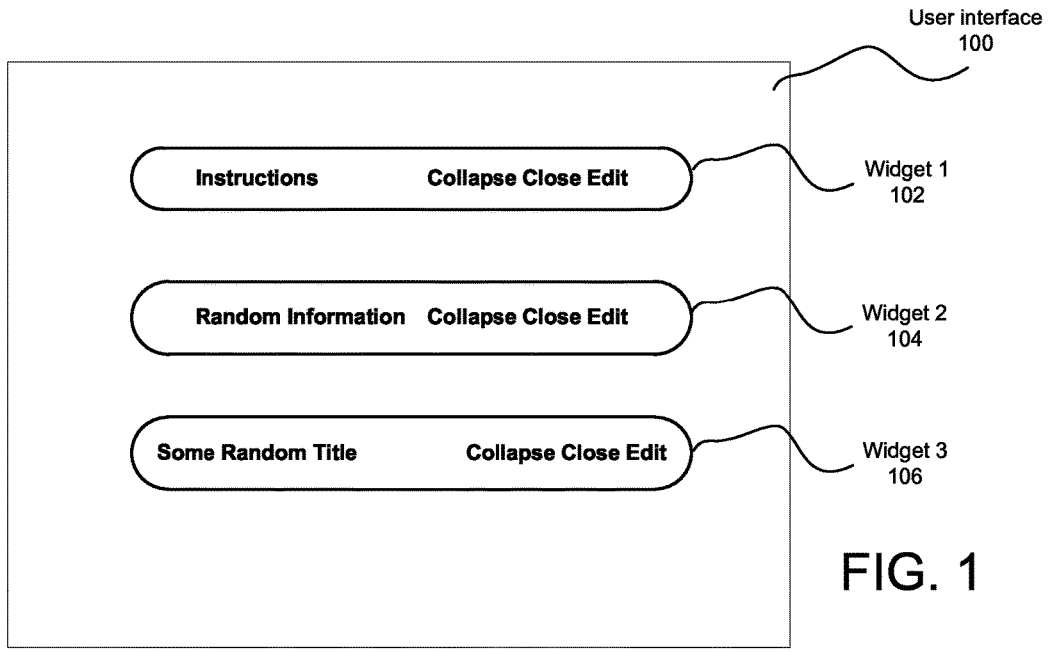
FIG. 1
FIG. 2
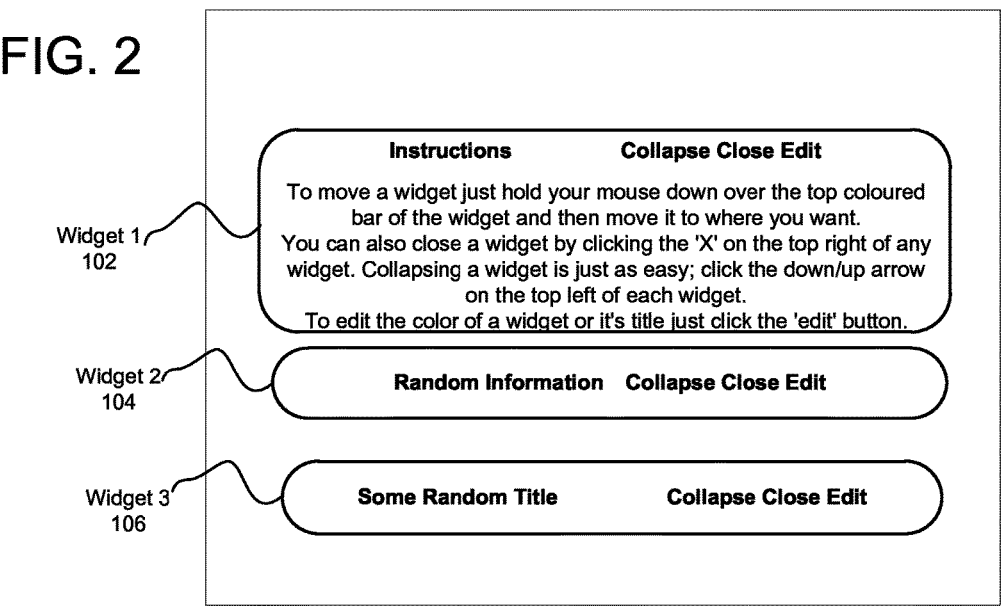

| Path | State # | Contents Hash |
|---|---|---|
| /html/body | 1 | @$!$#F@)J#4O3rn0f29r3m19 |
|  | 8 | *&^$^@J$$P@@$#$#_!$_*!$_* |
| /html/body/div#div#divDialogContent | 2 | GPDFJD){PL"I{#R$$)%$*l_$#!! |
| /html/body/div#div#divDialogContent/div.FeaturedWrap | 3 | <VMLCVCPQI#$!_{~)__|KEF)_I) |
|  | 5 | {:$%@)(@#*GRJPGFD{#@)( |
|  | 6 | ?"$#%*%@$)(#H!1_DH|||#R!#| |
| /html/body/div#div#divDialogContent/div.ShareDialog | 4 | +_@#@D|?"FF>)_@#$|!$|R)$%~ |
|  | 9 | +(_#!|FT$GFKJODJQ@)#URE |
| /html/body/div#div#divContent | 7 | ><EF>F<$||@|#%${$#%*$^RGE| |
|  | 10 | |F"?<(_)O!!~~~MLD:VCD_AS |

Relaxed XPath 902   State identifier 904   Subtree hash 906

IDENTIFYING CLIENT STATES

TECHNICAL FIELD

This disclosure relates generally to application states in a data processing system and more specifically to identifying client states of a rich Internet application in the data processing system.

BACKGROUND ART

A web crawler needs to have a means of identifying client states of a web application that it's crawling, to be able to deduce a reasonable model of the web application as a state machine.

Traditionally, a universal resource locator (URL) was used as a unique identifier of a state of a web application, since in a world of traditional web applications one safely assumed there was a one-to-one correlation between client states of a web application and associated URLs. Crawling rich Internet applications that frequently use a grouping of technologies collectively referred to as asynchronous JavaScript® and extensible markup language (XML) asynchronous JavaScript and XML (AJAX) calls, however, has been a challenge since in these web applications, the URL does not uniquely identify a client state of the web application. As a result, the crawler needs to have an alternative method of identifying client states.

Current solutions typically take a snapshot of a document object model (DOM) of a client state at a particular time, exclude irrelevant and unimportant data from the captured data of the snapshot, and assign a unique identifier to a resulting DOM, for example, by computing a hash of the DOM of the respective instance. Using this technique, whenever the crawler encounters a DOM, which was not encountered previously, the crawler considers the new DOM as a new state of the web application.

However, a user interface of a rich Internet application is typically composed of several different parts, each of which interact with a user independently of other parts. For example, in a case of mashup applications and webpages containing widgets, individual applications and widgets typically act independently. As a result, different combinations of widgets can easily be displayed to the user in various ways, forming new DOMs, which were never before encountered.

A typical drawback of current solutions is a state explosion because the occurrences of DOMs, which were never encountered before and are considered new application states, are really just a new combination of parts of an already-seen DOM. Accordingly the independent property of the parts of the user interface can easily lead to a state space explosion as the number of independent parts in a web application increases, effectively reducing the possibility of the web crawler to finish crawling a particular web application when the crawler uses a current state definition approach.

A simple example illustrating the problem is shown in FIG. 1 through FIG. 4 of a user interface building tutorial which uses a plurality of widgets.

With reference to FIG. 1 a screenshot of a portion of a user interface in which DOM 1=State 1 is presented. Consider an application of the example containing only 3 widgets, as shown in FIG. 1, in which an initial state is identified as DOM 1=State 1. Each time one of widget 1 102, widget 2 104 or widget 3 106 is opened, content of the opened widget is retrieved from a server and inserted into the DOM of the page represented in user interface 100.

With reference to FIG. 2 is a screenshot of a portion of user interface 100 in which DOM 2=State 2 is presented. When a crawler expands widget 1 102 on the page, as shown in FIG. 1, a new state occurs as shown in FIG. 2. FIG. 2 accordingly illustrates DOM 2=State 2 for a portion of the application.

With reference to FIG. 3 a screenshot of the portion of user interface 100 of FIG. 2 in which DOM 3=State 3 is presented. Furthermore, when the crawler expands widget 2 104, in addition to widget 1 102 as in FIG. 2, a further new state results as shown in FIG. 3 in which DOM 3=State 3. Note that State 3 however is simply a combination of the expansion of the prior two widgets, widget 1 102 and widget 2 104, which were opened previously.

With reference to FIG. 4 a screenshot of a portion of user interface 100 in which DOM 4=State 4 is presented. When the crawler returns to State 1 and expands only widget 2 104, a new state in which DOM 4=State 4 as illustrated in FIG. 4 occurs.

The example illustrates how the three widgets on a page of the web application can easily lead to a state explosion, since every widget independently may have other internal states, and respective combinations of widgets can effectively disable a web crawler because of the occurrence of a plurality of states. In analyzing the states of the example, a human user can readily perceive information contained in State 3 of FIG. 3 is redundant, simply consisting of a union of State 2 and State 4. However, the combination is not apparent to a web crawler using a complete DOM as a means to create states. Each state is accordingly treated as a unique DOM instance.

SUMMARY

According to one embodiment, a computer-implemented method for identifying client states receives a set of paths representative of a document object model (DOM) associated with a web page of a rich Internet application and for each path in the set of paths received by a processor, extracts a subtree, as Subtree X, for a current path. The computer-implemented method further traverses all known sub-paths under the current path and deletes corresponding subtrees from Subtree X; reads contents of and determines states of Subtree X to form a State X; and adds the State X to a set of current states. Responsive to a determination no more paths exist, the computer-implemented method returns the set of current states of the rich Internet application.

According to another embodiment, a computer program product for identifying client states comprises a computer recordable-type storage device containing computer executable program code stored thereon. The computer executable program code comprises computer executable program code for receiving a set of paths representative of a document object model (DOM) associated with a web page of a rich Internet application; computer executable program code, for each path in the set of paths received by the processor, for extracting a subtree, as Subtree X, for a current path; computer executable program code for traversing all known sub-paths under the current path and deleting corresponding subtrees from Subtree X; computer executable program code for reading contents of and determining states of Subtree X to form a State X; computer executable program code for adding the State X to a set of current states; and computer executable program code responsive to a determination no more paths exist, for returning the set of current states of the rich Internet application.

According to another embodiment, an apparatus for identifying client states comprises a communications fabric; a memory connected to the communications fabric, wherein the memory contains computer executable program code; a communications unit connected to the communications fabric; an input/output unit connected to the communications fabric; a display connected to the communications fabric and a processor unit connected to the communications fabric. The processor unit executes the computer executable program code to direct the apparatus to receive a set of paths representative of a document object model (DOM) associated with a web page of a rich Internet application and for each path in the set of paths received, extract a subtree, as Subtree X, for a current path. The processor unit further executes the computer executable program code to direct the apparatus to traverse all known sub-paths under the current path and delete corresponding subtrees from Subtree X; read contents of and determining states of Subtree X to form a State X; add the State X to a set of current states; and responsive to a determination no more paths exist, return the set of current states of the rich Internet application.

BRIEF DESCRIPTION OF DRAWINGS

For a more complete understanding of this disclosure, reference is now made to the following brief description, taken in conjunction with the accompanying drawings and detailed description, wherein like reference numerals represent like parts.

FIG. 1 is a screenshot of a portion of a user interface in which DOM 1=State 1;

FIG. 2 is a screenshot of a portion of a user interface in which DOM 2=State 2;

FIG. 9 is a tabular representation of a data structure containing a list of all paths using a process of the state identification system of FIG. 7 in accordance with an embodiment of the disclosure;

DETAILED DESCRIPTION

Figure 3:
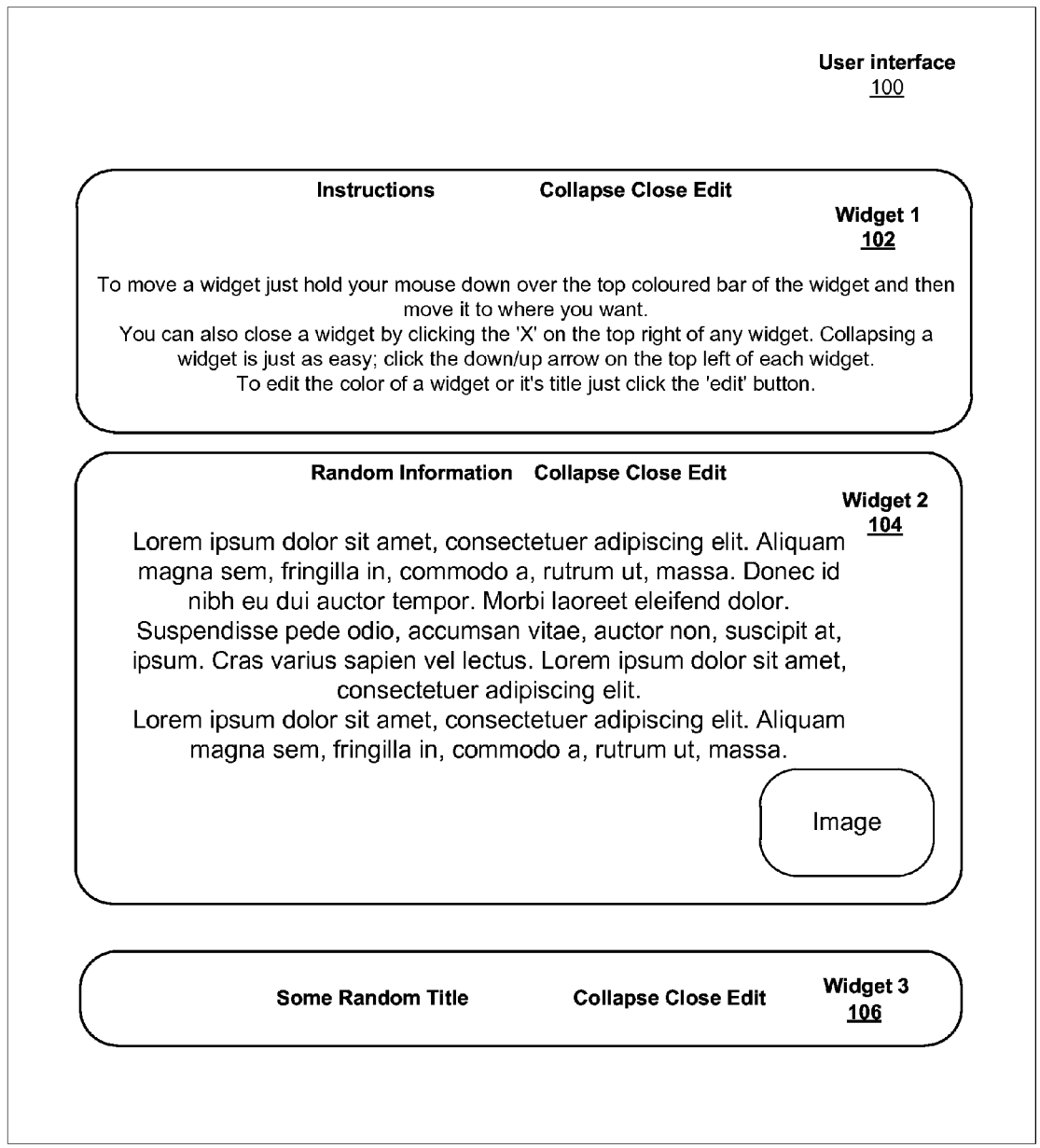
FIG. 3 is a screenshot of a portion of a user interface in which DOM 3=State 3.
Figure 4:
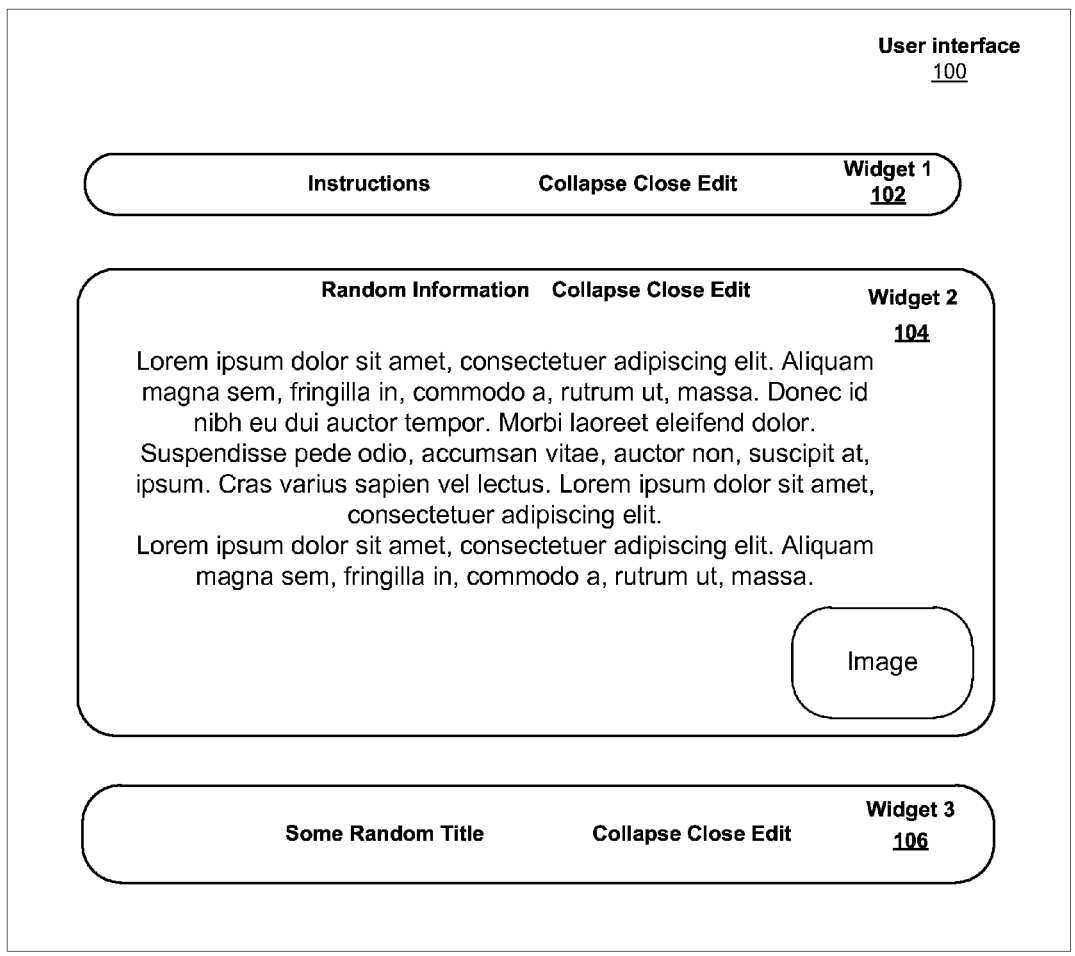
FIG. 4 is a screenshot of a portion of a user interface in which DOM 4=State 4.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation®, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 5:
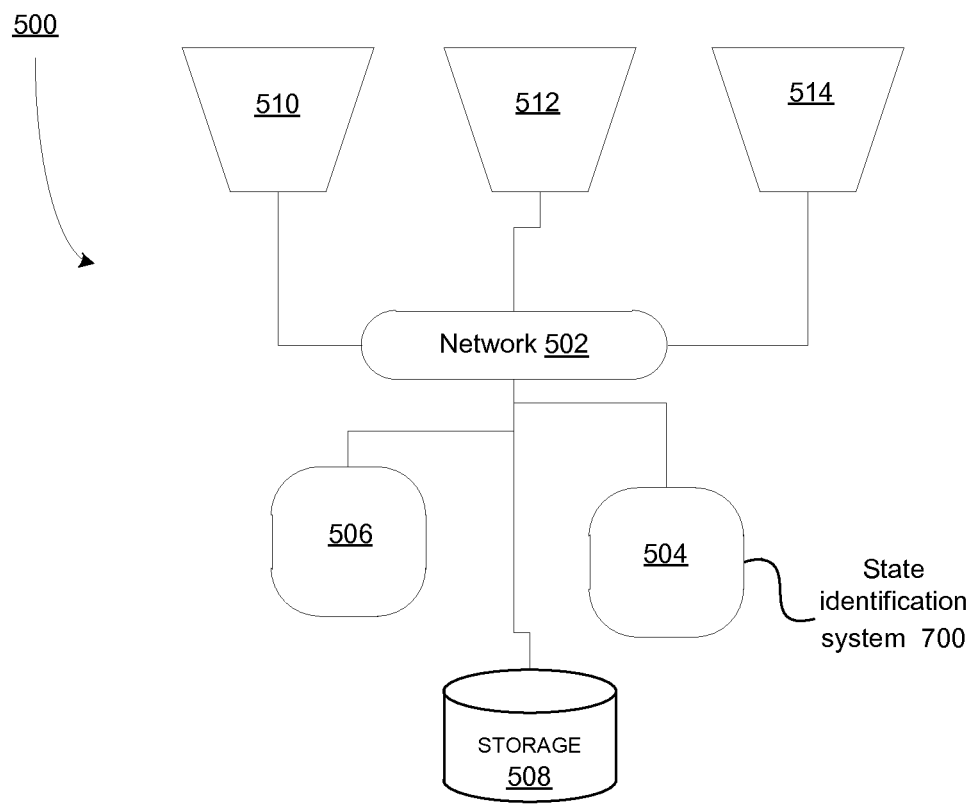
FIG. 5 is a block diagram of an exemplary network data processing system including a state identification system in an embodiment of the disclosure.
Figure 6:
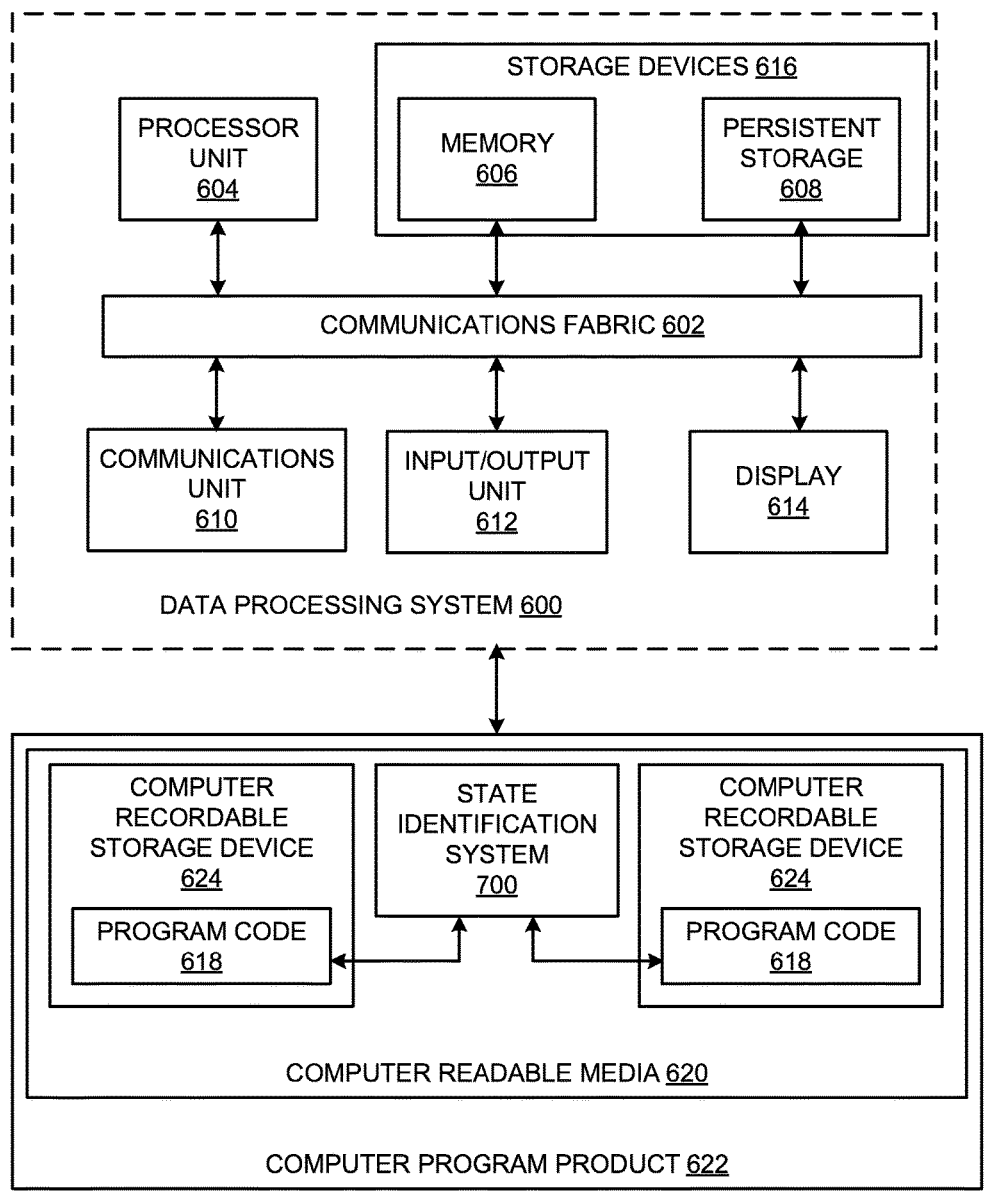
FIG. 6 is a block diagram of an exemplary data processing system including a state identification system in an embodiment of the disclosure.

With reference now to the figures and in particular with reference to FIG. 5 and FIG. 6, exemplary diagrams of data processing environments are provided in which illustrative embodiments may be implemented. It should be appreciated that FIG. 5 and FIG. 6 are only exemplary and are not intended to assert or imply any limitation with regard to the environments in which different embodiments may be implemented. Many modifications to the depicted environments may be made.

FIG. 5 depicts a pictorial representation of a network of data processing systems in which illustrative embodiments may be implemented. Network data processing system 500 is a network of computers in which the illustrative embodiments may be implemented. Network data processing system 500 contains network 502, which is the medium used to provide communications links between various devices and computers connected together within network data processing system 500. Network 502 may include connections, such as wire, wireless communication links, or fiber optic cables.

In the depicted example, server 504 and server 506 connect to network 502 along with storage unit 508. In addition, clients 510, 512, and 514 connect to network 502. Clients 510, 512, and 514 may be, for example, personal computers or network computers. In the depicted example, server 504 provides data, such as boot files, operating system images, and applications to clients 510, 512, and 514. Clients 510, 512, and 514 are clients to server 504 in this example. Network data processing system 500 may include additional servers, clients, and other devices not shown.

In the depicted example, network data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 500 also may be implemented as a number of different types of networks, such as for example, an intranet, a local area network (LAN), or a wide area network (WAN). FIG. 5 is intended as an example, and not as an architectural limitation for the different illustrative embodiments.

With reference to FIG. 6 a block diagram of an exemplary data processing system operable for various embodiments of the disclosure is presented. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation. Further, processor unit 604 may be implemented using one or more heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example without limitation, data, program code in functional form, and/or other suitable information either on a temporary basis and/or a permanent basis. Memory 606, in these examples, may be, for example, a random access memory or any other suitable volatile or non-volatile storage device. Persistent storage 608 may take various forms depending on the particular implementation. For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications and/or programs may be located in storage devices 616, which are in communication with processor unit 604 through communications fabric 602. In these illustrative examples the instructions are in a functional form on persistent storage 608. These instructions may be loaded into memory 606 for execution by processor unit 604. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or tangible computer recordable storage media, such as memory 606 or persistent storage 608.

Program code 618 is located in a functional form on computer readable media 620 that in one embodiment is selectively removable and may be loaded onto or transferred to data processing system 600 for execution by processor unit 604. Program code 618 and computer readable media 620 form computer program product 622 in these examples. In one example, computer readable media 620 may be in a tangible form, such as, for example, an optical or magnetic disc that is inserted or placed into a drive or other device that is part of persistent storage 608 for transfer onto a storage device, such as a hard drive that is part of persistent storage 608. In a tangible form, computer readable storage media 620 also may take the form of a persistent storage, such as a hard drive, a thumb drive, or a flash memory that is connected to data processing system 600. The tangible form of computer readable media 620 is also referred to as computer recordable storage media or a computer readable data storage device. In some instances, computer readable media 620 may not be removable. The embodiments of computer recordable storage media or a computer readable data storage device do not encompass computer readable transmission media or computer readable signal media.

Alternatively, program code 618 may be transferred to data processing system 600 from computer readable media 620 through a communications link to communications unit 610 and/or through a connection to input/output unit 612. The communications link and/or the connection may be physical or wireless in the illustrative examples.

In some illustrative embodiments, program code 618 may be downloaded over a network to persistent storage 608 from another device or data processing system for use within data processing system 600. For instance, program code stored in a computer recordable data storage device in a server data processing system may be downloaded over a network from the server to data processing system 600. The data processing system providing program code 618 may be a server computer, a client computer, or some other device capable of storing and transmitting program code 618.

Using data processing system 600 of FIG. 6 as an example, a computer-implemented process for identifying client states is presented. Processor unit 604 receives a set of paths representative of a document object model (DOM) associated with a web page of a rich Internet application and for each path in the set of paths received by the processor unit, processor unit 604 extracts a subtree, as Subtree X, for a current path. Processor unit 604 further traverses all known sub-paths under the current path and deletes corresponding subtrees from Subtree X, reads contents of and determines states of Subtree X to form a State X and adds the State X to a set of current states. Processor unit 604 further responsive to a determination no more paths exist, returns the set of current states of the rich Internet application.

Figure 7:
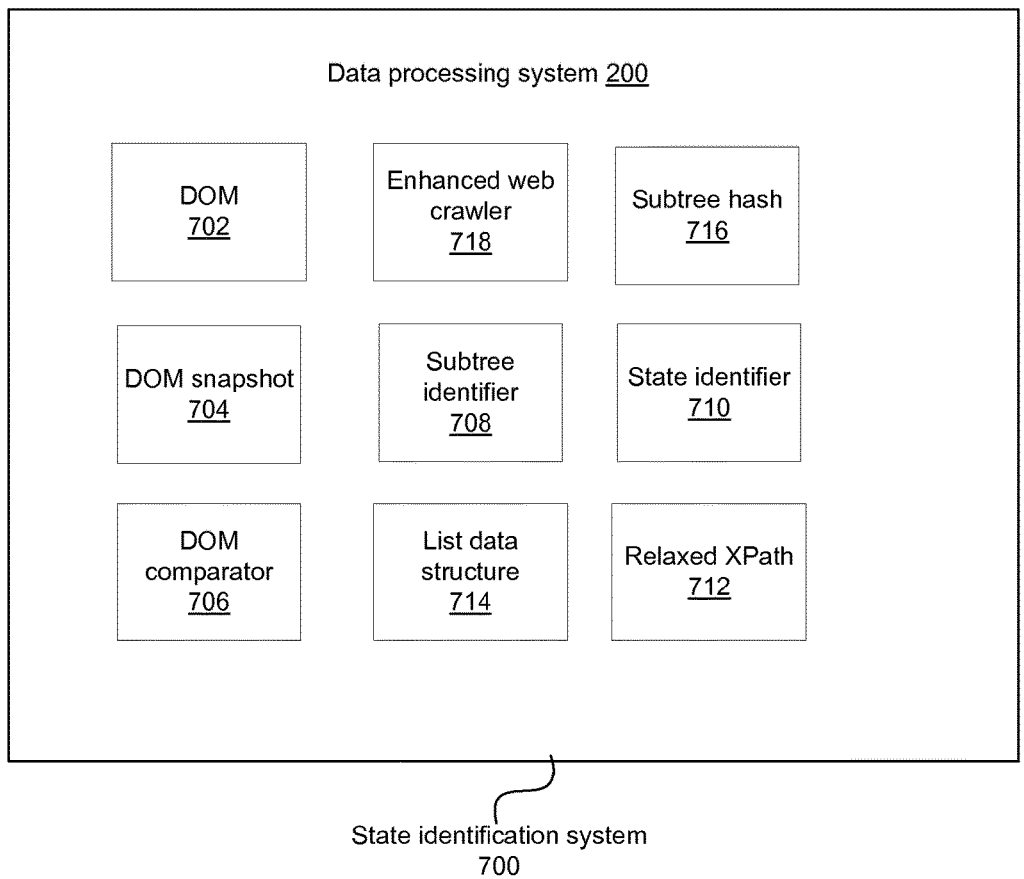
FIG. 7 is a block diagram of a state identification system operable for various embodiments of the disclosure.

With reference to FIG. 7 a block diagram representation of a state identification system operable for various embodiments of the disclosure is presented. State identification system 700 is an example of an embodiment of identifying client states of a rich Internet application of the disclosure.

State identification system 700 leverages support of an underlying data processing system such as network data processing system 500 of FIG. 5 or data processing system 600 of FIG. 6. State identification system 700 comprises a number of components including document object model (DOM) 702, DOM snapshot 704, DOM comparator 706, subtree identifier 708, state identifier 710, relaxed XPath 712, list data structure 714, subtree hash 716 and enhanced web crawler 718. The components need not be implemented as shown in the form of unique functional components and may be implemented using more or fewer components shown without loss of function or capability.

DOM 702 is a data structure representation of a web page of interest. The web page is a target web page accessible to a web crawler, such as enhanced web crawler 718. The structural elements of the web page are described within the context of the DOM. The DOM has a well-defined hierarchy of elements from a root of the page to individual leaf nodes defining relationships among the elements.

DOM snapshot 704 is a data structure representation of a web page after a particular event has been executed. The data structure is a recorded representation of the overall page at an instance in time when the snapshot was taken. Typically a DOM snapshot is taken at a particular point in time such as before a specific event executes and as well as after the specific event executes. A comparison of the DOM before the specific event executes and after the specific event executes, using DOM comparator 706, provides a capability to determine whether there exists a difference in the two instances (the before and after snapshots) of the DOM.

Subtree identifier 708 provides a capability using a new dynamic approach for identifying independent parts of the DOM, based on observing the DOM changes while executing events. The technique of subtree identifier 708 works for web pages that do not have widgets as well. For defining boundaries, a relaxed version of XPath definitions is used. Embodiments of state identification system 700 of the disclosure describe a location of a particular subtree in DOM 702, in a way that works throughout different states of the web application. Because some attributes that are usually considered in constructing an XPath expression are too volatile (therefore likely to change) to be considered consistent throughout the application, the attributes are omitted to obtain a more robust XPath definition using relaxed XPath 712 to define a location of a subtree in different DOMs of the same web application.

In addressing a subtree within a DOM that can contains states, a process of subtree identifier 708 traverses from the root of the web page of interest to the root of the subtree. Subtree identifier 708 constructs a string containing a tag and consistent attributes of each of the elements encountered within the route traversed. Consistent attributes are attributes that are unlikely to change, for example, a similar element but with a different value of a consistent attribute has semantically different meaning. Examples of consistent attributes are id and class. An example of a relaxed XPath is expressed as /html/body/div#dvClipList/div.ListItem/a.Pop-Score, in which a slash is used as a delimiter between elements. For each element, there is an element tag name, then a dot and value of a class attribute when existent, and then a sharp sign and a value of the ID attribute when existent.

This particular addressing structure for a subtree is not unique. Accordingly, multiple subtrees can exist in a single DOM tree with identical relaxed XPaths, therefore querying a single relaxed Xpath in a DOM can lead to multiple results. For example, representations of items in a product list usually have the same relaxed XPath, whereas a selected item in the list usually yields a different relaxed XPath because the selected item is usually assigned a different class attribute by the application.

State identifier 710 provides a capability of assigning states to independent subtrees of a DOM as identified by subtree identifier 708. Different subtrees of the DOM therefore have respective assigned states.

List data structure 714 provides a capability to store and maintain in a data structure a list of all paths in a set of subtrees using the process of the state identification system. Enhanced web crawler 718 manages a list of relaxed XPaths, comprising list data structure 714 that points to subtrees, in a particular DOM, that contain independent states, as well as information about which states can appear under each subtree. List data structure 714, which is also known as list_of_all_paths in the example, may be represented in a tabular form or other type of structure as required in an implementation of an embodiment of state identification system 700 of the disclosure.

Subtree hash 716 provides a capability to create a hash value for each subtree identification string derived from using subtree identifier 708. The hashed value provides a compressed unique representation of the input data suitable for a later comparison operation.

Enhanced web crawler 718 provides a capability to identify independent subtrees within a particular DOM and accordingly better recognize the behavior of the application, and to be able to predict behavior more precisely. Assigning states to independent subtrees of a DOM, requires enhanced web crawler 718 to have a method of detecting subtrees that act independently of each other, as well as a method for describing the boundaries of each subtree, in a way that is consistent throughout the dynamic behavior of the web application. The process of subtree identifier 708 and state identifier 710 provide the needed capability of detecting independent subtrees and associated states.

Figure 8:
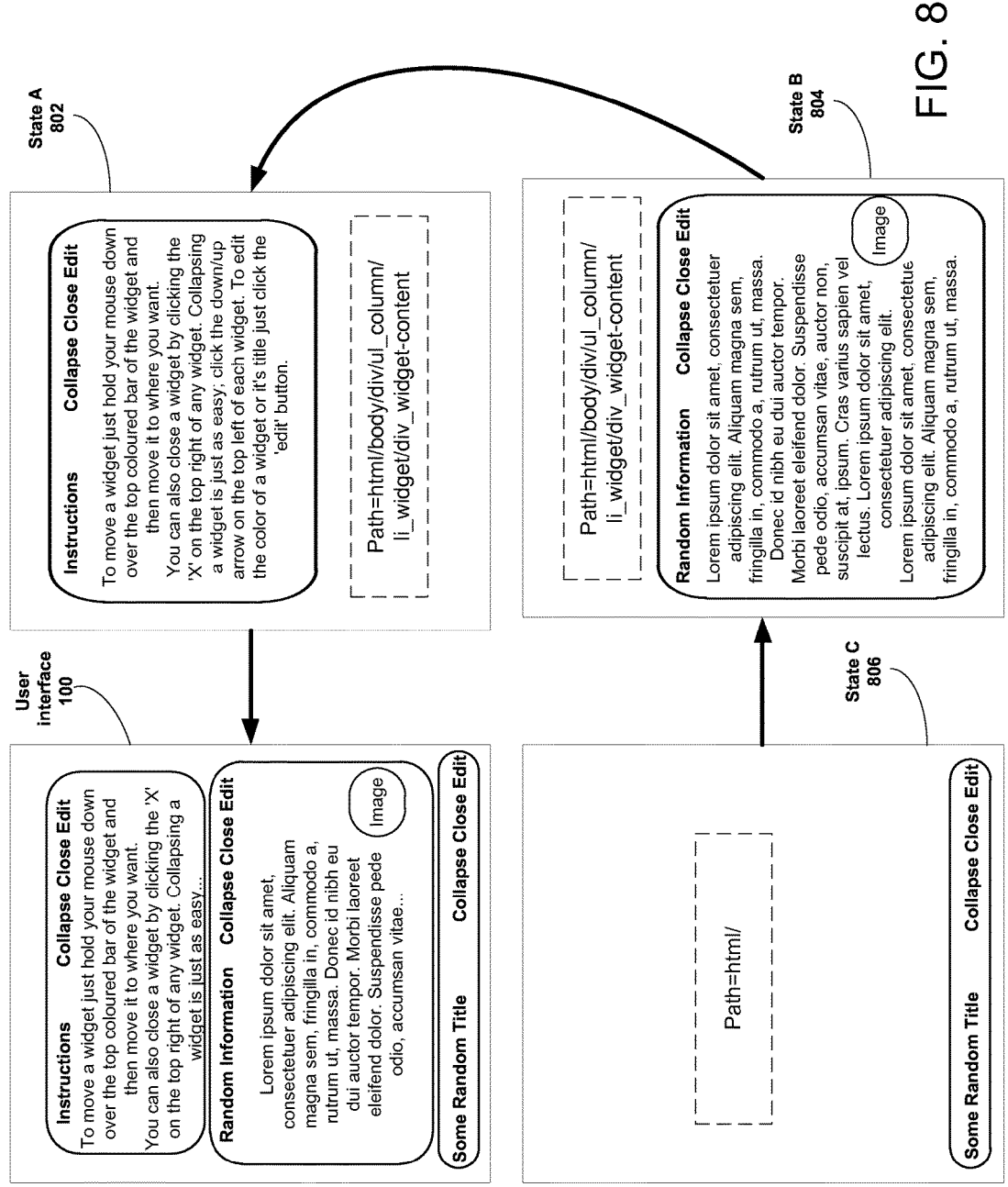
FIG. 8 is a screenshot of portions of a user interface in which State 3 of FIG. 3 is represented as a set of multiple states in accordance with an embodiment of the disclosure.

With reference to FIG. 8, a screenshot of portions of a user interface in which State 3 of FIG. 3 is represented as a multiple of states in accordance with one embodiment of the disclosure is presented.

FIG. 8 represents the initial state of user interface 100 of FIG. 1. The overall state of a DOM representing FIG. 8 is accordingly depicted as a set of states. State A 802 represents the expansion of widget 1 102 of FIG. 100. In a corresponding manner State B 804 represents the expansion of widget 2 104 while State C 806 represents the remainder of FIG. 8 after widget 1 102 and widget 2 104 of FIG. 100 have been removed. State C 806 represents a container of a page. In this state existence of other page elements such as widgets is unknown. However what is known is widget 1 102 and widget 2 104 of FIG. 100 have been excluded from the particular page and what remains is the container.

Each state accordingly represents a respective independent subtree of the DOM of FIG. 8. Each state accordingly has an associated XPath expression defining a path. As stated previously the representative paths may not be unique for each identified state. Rather than assigning a state identifier to the entire DOM, as a whole using the disclosed features, different subtrees of the DOM have associated respective states, therefore a corresponding web application is more correctly described as being in a set of states, rather than in a single state at a particular point in time. Using this principle, State 3 of FIG. 3 is now a combination of states as illustrated in FIG. 8. FIG. 8 more accurately represents the DOM of the page as actually being composed of three States as follows, State A 802, State B 804, and State C 806.

The capability of multiple states associated with respective independent subtrees can help the crawler have a better understanding of the behavior of the application, and accordingly be able to predict the behavior more precisely. To be able to assign states to independent subtrees of a DOM, the crawler has a method of detecting subtrees that act independently of each other, as well as a method for describing the boundaries of each subtree, in a way that is consistent throughout the dynamic behavior of the web application. The method is provided in the form methods or procedures for determining a list of all paths and for a set of current states as described later in FIG. 10.

With reference to FIG. 9 a tabular representation of a data structure containing a list of all paths using a process of the state identification system of FIG. 7 in accordance with one embodiment of the disclosure is presented.

Table 900 is an example of a data structure containing a list of all paths for a corresponding DOM of a particular web page. In the example of table 900 there are three columns comprising relaxed Xpath 902, state identifier 904 and subtree hash 906. As previously stated table 900 is one example of an embodiment to contain the information associated with respective triplets of path, state identifier and subtree associated with a state analysis of a particular DOM representation of a web page. As shown in the example, one entry of a path identified in Relaxed XPath 902 can point to different States. In the first row of the example, the path identified as /html/body has two state entries of 1 and 8 as well as corresponding contents hash of (@$J$#F@) J#403rn0f29r3m19 and *&^$^@J$$P@@$#$#_!$_*!$_*.

Relaxed Xpath 902 indicates a path definition for a corresponding subtree portion of the DOM that contains independent states. Multiple subtrees can exist in a single DOM tree with identical relaxed XPaths. The list of relaxed XPaths 902 point to subtrees in a DOM that contain independent states, as well as information about which states appear under each of the respective subtrees.

State identifier 904 contains the State IDs of the subtrees of the DOM that are identified by the Relaxed XPath. State identifier 904 indicates a value of an assigned state identifier for a unique subtree. As stated previously a relaxed XPath can have multiple associated subtrees and therefore also multiple corresponding state identifiers. The state values are unique and distinguished from one another. The values may be derived from a predefined range of values or simply left as an open ended monotonically increasing set of values.

Subtree hash 906 contains a hash value created using one of available hash functions to hash a respective subtree path definition for a particular state. For example, a hash for the path /html/body, with an associated state identifier of 1 or 8 results in a hash value of @$J$#F@)J#403rn0f29r3m19 or *&^$^@J$$P@@$#$#_!$_*!$_* respectively.

Figure 10:
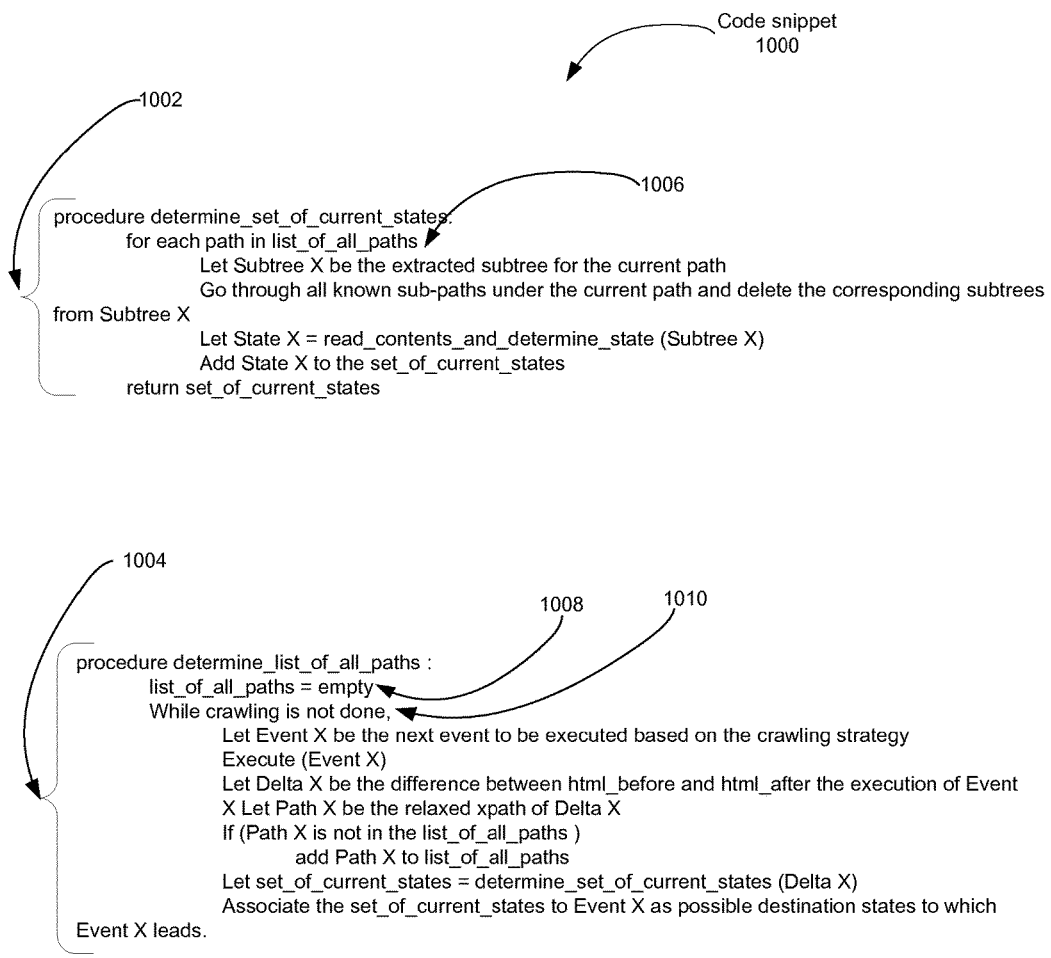
FIG. 10 is a code snippet of pseudo code for determining an application state using the system of the state identification system of FIG. 7 in accordance with an embodiment of the disclosure.

With reference to FIG. 10 a code snippet of pseudo code for determining an application state using the state identification system of FIG. 7 in accordance with an embodiment of the disclosure is presented. Code snippet 1000 provides pseudo code examples of determining the application state and discovering independent subtrees as used in an embodiment of the state identification system of FIG. 7.

Portion 1002 of code snippet 1000 represents an example of a procedure for determining a set of current states in a pseudo code representation. The procedure of portion 1002 is dependent upon the associated portion 1004 in which is determined a list of paths representing the independent subtrees of a DOM being analyzed.

The procedure, labeled determine_set_of_current_states in the example, iterates through each path (previously identified), as indicated in statement 1006, in a data structure referred to as list_of_all_paths, which is an example of list data structure 714 of FIG. 7. Subtree X is defined in the procedure to represent an extracted subtree for a current path. All known sub-paths under the current path are traversed and corresponding subtrees from Subtree X are deleted from the overall container, for example, represented by an /html/body path statement. There is no variant of an /html/body path A State X is identified through a read_contents_and_determine_state of the Subtree X.

The procedure adds each State X identified to the set_of_current_states. When there are no more paths to process in the list_of all_paths, a set_of current_states is returned as a result of executing the procedure.

For the procedure of portion 1002 to operate, a web crawler uses a method of discovering independent subtrees, so the web crawler can populate the data structure referred to as list_of_all_paths. Different methods can be applied including performing a static analysis of the contents of the DOM and discovering independent subtrees based on respective code similarity. An example of this technique currently in use is referred to as widget detection. However when using the widget detection technique currently the technique cannot rely on widgets being on the page at all times.

Using an embodiment of the disclosure, however a new dynamic approach for identifying independent parts of the DOM using observed DOM changes while executing events is used. The dynamic approach described in the disclosure also functions for web pages that do not have widgets as well.

Portion 1004 of code snippet 1000 is an example of a procedure for discovering independent subtrees. In this procedure, the data structure referred to as list_of all_paths is empty on initiation of the procedure, as indicated in statement 1008. When the web crawler executes an event, the web crawler also investigates to detect a possible change in the DOM. A set of operations is performed while the web crawler is crawling, until crawling is completed, as indicated in statement 1010.

While a crawling operation is performed, the procedure defines an Event X as the next event to be executed based on a crawling strategy. Event X is executed and the effect on the DOM as a result of executing the event is observed. A Delta X is defined as a difference between an html_before execution instance and html_after execution instance as a result of performing Event X.

The procedure defines Path X to be the relaxed XPath of the Delta X. When Path X is not located in the list_of_all_paths (not previously defined or discovered and added), the procedure adds an entry for Path X to the list_of_all_paths.

The procedure assigns a set_of current_states as the states returned from determine_set_of current states for the Delta X. The set_of_current_states is associated with Event X as possible destination states to which Event X leads.

Figure 11:
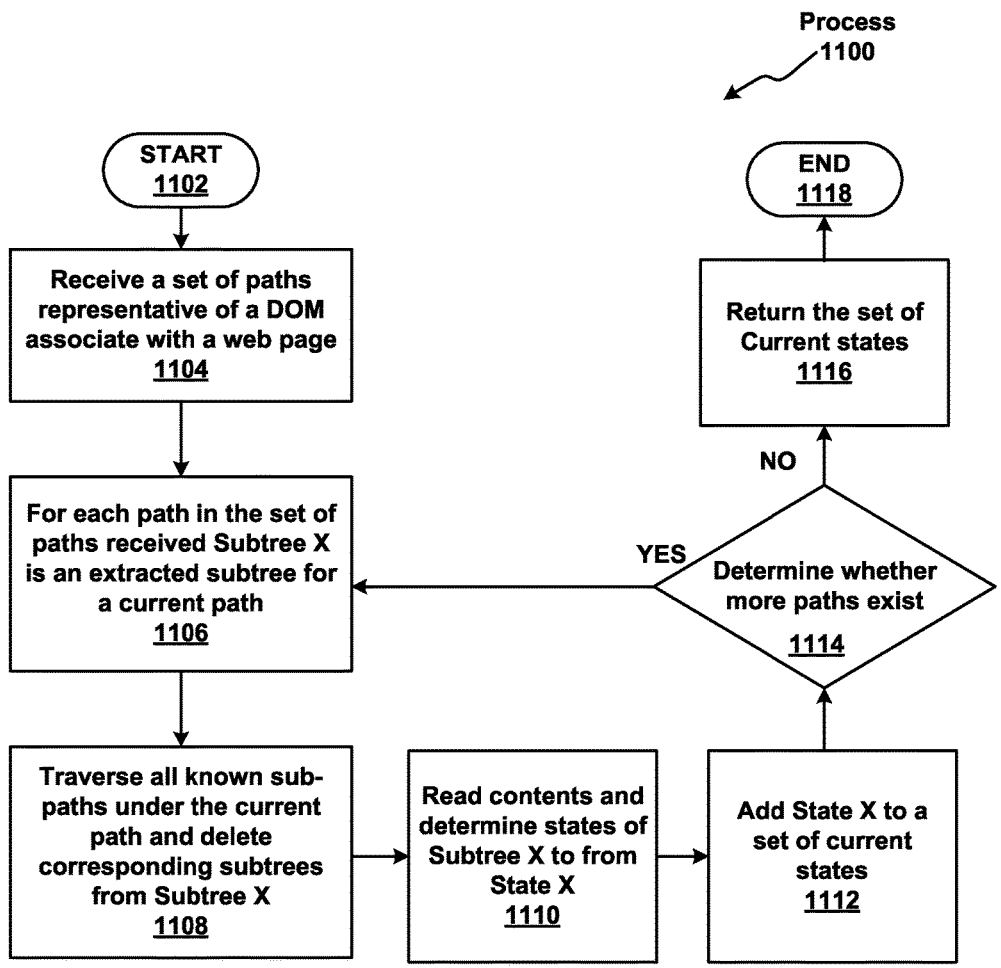
FIG. 11 is a flowchart of a process for determining an application state using the system of the state identification system of FIG. 7 in accordance with an embodiment of the disclosure.

With reference to FIG. 11 a flowchart of a process for determining an application state using the state identification system of FIG. 7 in accordance with one embodiment of the disclosure is presented. Process 1100 is an example of an embodiment of state identifier 710 of FIG. 7 and a use of the pseudo code example of portion 1004 of code snippet 1000 of FIG. 10.

Process 1100 starts (step 1102) and receives a set of paths representative of a DOM (step 1104). The DOM in this case is a hierarchical representation of a web page of interest. For each path in the set of paths received, process 1100 lets Subtree X be an extracted subtree for a current path (step 1106). Process 1100 traverses all known sub-paths under the current path and deletes corresponding subtrees from the Subtree X (step 1108). The corresponding subtrees are deleted to remove unnecessary entries to avoid needless processing of the entries. Subtrees can be contained inside each other and since subtree states are considered independent, a state of an inner subtree should not affect the state of the outer subtree, or vice versa. Hence, when looking at the contents of a subtree to determine an associated state, any contents that belong to an inner subtree should be ignored.

Process 1100 lets State X to be the result of a read of contents of Subtree X and a determination of states associated with subtree X (step 1110). For the Subtree X the contents are accordingly examined and a respective state is determined. Process 1100 adds the State X to a set of current states (step 1112). The new entry for State X is added to a data structure containing the states resulting from processing the set of paths. For example, in table 900 of FIG. 9 the first column in the table is the Relaxed XPath, (such as the current path of Subtree X being processed), the second column contains the State IDs of the subtrees of the DOM that are identified by the Relaxed XPath (the state of Subtree X just processed) and the last column contains the hash of the Subtree X.

Process 1100 determines whether more paths exist (step 1114). Responsive to a determination more paths exist, process 1100 returns to step 1106 as before to process a next path. Responsive to a determination no more paths exist, process 1100 returns the set of current states (step 1106) and terminates thereafter (step 1118).

Figure 12:
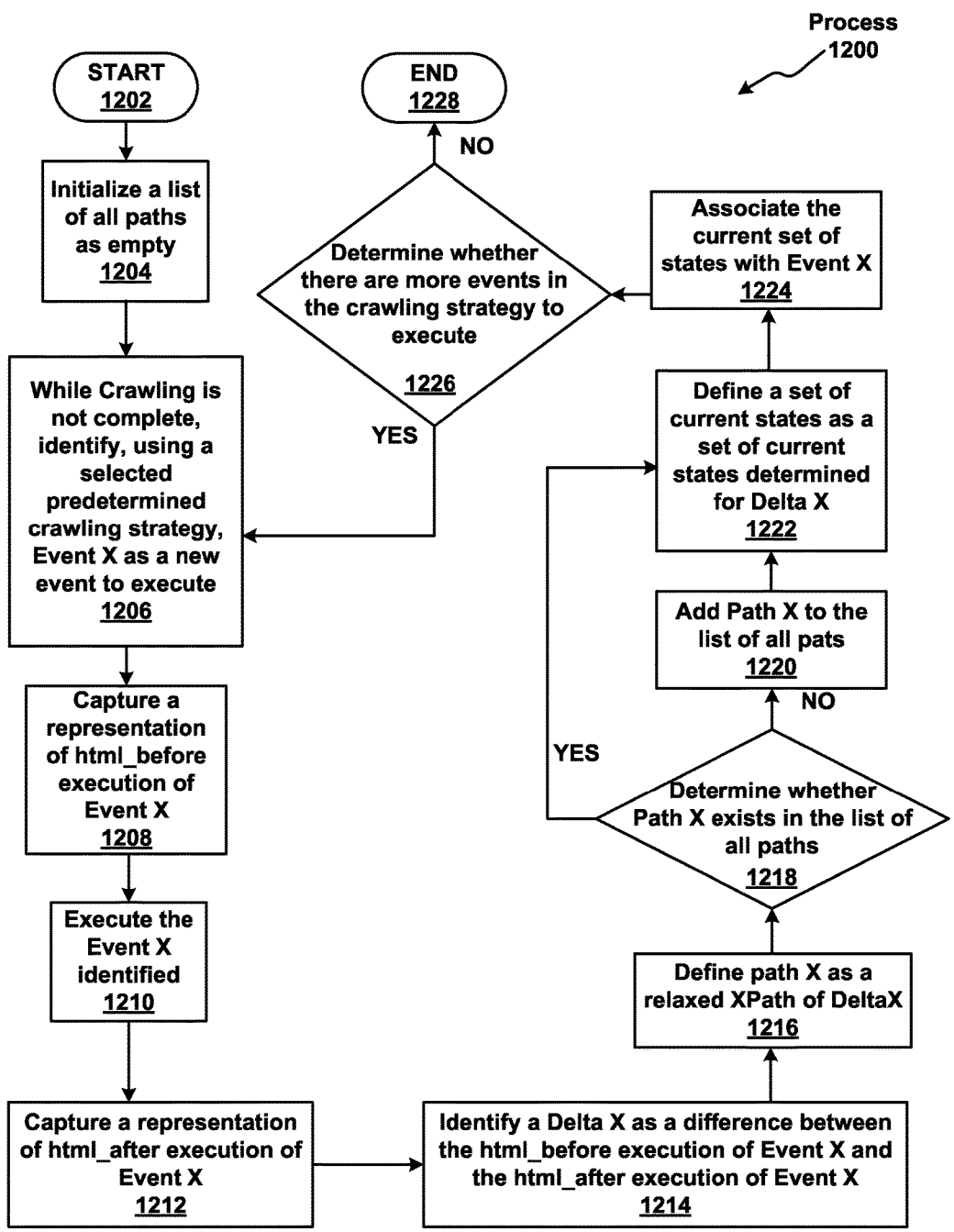
FIG. 12 is a flowchart of a process for discovering independent subtrees using the system of the state identification system of FIG. 7 in accordance with an embodiment of the disclosure.

With reference to FIG. 12 a flowchart of a process for discovering independent subtrees using the system of the state identification system of FIG. 7 in accordance with one embodiment of the disclosure is presented. Process 1200 is an example of an embodiment of subtree identifier 708 used to populate list data structure 714 of FIG. 7.

Process 1200 begins (step 1202) and initializes a list of all paths as empty (step 1204). A data structure such as table 900 of FIG. 9 is used to contain the results of processing using the procedures of process 1100 of FIG. 11 and process 1200. When a web crawler needs to know a current overall state of the application, the web crawler needs to look at the contents of each subtree of the DOM being investigated and compare a given subtree to the known subtrees to determine the state of that particular subtree. The state of the whole application is represented by the set of current states of the representative subtrees.

While crawling does not occur, process 1200 identifies using a selected predetermined crawling strategy, an Event X as a next event to schedule to execute (step 1206). The crawling strategy chosen is independent of the operation of the described process and is only used to identify a next event or sequence of events associated with a received DOM representative of the web page of interest.

Process 1200 captures a representation of an html_before execution of Event X (step 1208). The representation is a DOM tree snapshot before the execution of the event identified as Event X. Process 1200 executes Event X identified (step 1210). Process 1200 captures a representation of an html_after execution of Event X (step 1212). The representation is a DOM tree snapshot after the execution of the event identified as Event X. To detect independent subtrees, process 1200 executes each event on the page and obtains a diff between the DOM tree snapshots before and after the execution of the event. The subtree of the DOM that has changed as a result of the event execution is considered a part that can contain states independently.

Process 1200 lets Delta X be a difference between the html_before execution of the Event X and the html_after execution of the Event X (step 1214). Process 1200 lets Path X be a relaxed XPath of Delta X (step 1216).

Process 1200 determines whether Path X exists in the list of all paths (step 1218). Responsive to a determination that Path X does not exist in the list of all paths; process 1200 adds Path X to the list of all paths (step 1220). Process 1200 further defines a set of current states as the set of current states for Delta X (step 1222)

Process 1200 associates the current set of states with Event X (step 1224). Process 1200 determines whether there are more events in the crawling strategy to execute (step 1226). Responsive to a determination that there are more events in the crawling strategy to execute, process 1200 returns to step 1206 as before. Responsive to a determination that there are no more events in the crawling strategy to execute, process 1200 terminates thereafter (step 1228).

Thus is presented in an illustrative embodiment a computer-implemented method for identifying client states. The computer-implemented method on a data processing system comprises receiving, by a processor of the data processing system, a set of paths representative of a document object model (DOM) associated with a web page of a rich Internet application and for each path in the set of paths received by the processor, extracting a subtree, as Subtree X, for a current path. The computer-implemented method further traversing all known sub-paths under the current path and deleting corresponding subtrees from Subtree X, reading contents of and determining states of Subtree X to form a State X and adding the State X to a set of current states. The computer-implemented method further responsive to a determination no more paths exist, returning the set of current states of the rich Internet application.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for identifying client states, the computer-implemented method on a data processing system comprising:
    receiving, by a processor of the data processing system, a set of paths representative of a document object model (DOM) associated with a web page of a rich Internet application, wherein the receiving further comprises:
        initializing a list of all paths as empty;
        identifying using a selected predetermined crawling strategy Event X as a next event to execute;
        capturing a representation of an html_before execution of the Event X;
        executing the event X;
        capturing a representation of an html_after execution of the Event X;
        identifying a Delta X as a difference between the html_before execution of the event X and the html_after execution of the Event X;
        defining Path X as a relaxed XPath of Delta X; and
        responsive to a determination Path X does not exist in the list of all paths, adding Path X to the list of all paths;
    defining a set of current states as the set of current states determined for Delta X;
    for each path in the set of paths received by the processor:
        extracting a subtree, as Subtree X, for a current path;
        traversing known sub-paths under the current path and deleting corresponding subtrees from Subtree X;
        reading contents of and determining states of Subtree X to form a State X; and
        adding the State X to the set of current states;

associating the set of current states with Event X as possible destination states of the Event X; and responsive to a determination no more paths exist, returning the set of current states of the rich Internet application.

2. The computer-implemented method of claim 1, further comprising:
determining whether there are more events in the crawling strategy to execute; and
responsive to a determination there are more events in the crawling strategy to execute, return to identifying using a selected predetermined crawling strategy Event X as a next event to execute.

3. The computer-implemented method of claim 1, wherein the set of paths representative of a document object model (DOM) associated with a web page of a rich Internet application is a data structure comprising the list of all paths.

4. The computer-implemented method of claim 3, wherein the data structure comprising the list of all paths further comprises:
a set of entries, wherein each entry in the set of entries comprises a tuple representative of at least a path portion, a state identifier portion and a contents hash portion, wherein the path portion comprises a relaxed XPath definition, the state identifier portion indicates a value of an assigned state identifier for a unique subtree and the contents hash portion represents a subtree hash value.

5. The computer-implemented method of claim 4, wherein the path portion representing the relaxed XPath definition indicates a path definition for a corresponding subtree portion of the DOM that contains independent states, and wherein multiple subtrees can exist in a single DOM tree with identical relaxed XPaths.

6. The computer-implemented method of claim 4, wherein the value of the assigned state identifier is unique and distinguished from one another.

7. A computer program product for identifying client states comprising a computer readable storage medium having a computer readable application stored therein, wherein the computer readable application, when executed on a computing device, causes the computing device to:
receive a set of paths representative of a document object model (DOM) associated with a web page of a rich Internet application, wherein the receiving further comprises:
initializing a list of all paths as empty;
identifying using a selected predetermined crawling strategy Event X as a next event to execute;
capturing a representation of an html_before execution of the Event X;
executing the event X;
capturing a representation of an html_after execution of the Event X;
identifying a Delta X as a difference between the html_before execution of the event X and the html_after execution of the Event X;
defining Path X as a relaxed XPath of Delta X; and
responsive to a determination Path X does not exist in the list of all paths, adding Path X to the list of all paths;
define a set of current states as the set of current states determined for Delta X;
for each path in the set of paths received by a processor:
extract a subtree, as Subtree X, for a current path;
traverse known sub-paths under the current path and deleting corresponding subtrees from Subtree X;
read contents of and determining states of Subtree X to form a State X; and
add the State X to the set of current states;
associate the set of current states with Event X as possible destination states of the Event X; and
responsive to a determination no more paths exist, return the set of current states of the rich Internet application.

8. The computer program product of claim 7, wherein the computer application is further configured to:
determine whether there are more events in the crawling strategy to execute; and
responsive to a determination there are more events in the crawling strategy to execute, for returning to identify, use a selected predetermined crawling strategy, the Event X as a next event to execute.

9. The computer program product of claim 7, wherein the set of paths representative of a document object model (DOM) associated with a web page of a rich Internet application is a data structure comprising the list of all paths.

10. The computer program product of claim 9, wherein the data structure comprising the list of all paths further comprises:
a set of entries, wherein each entry in the set of entries comprises a tuple representative of at least a path portion, a state identifier portion and a contents hash portion, wherein the path portion comprises a relaxed XPath definition, the state identifier portion indicates a value of an assigned state identifier for a unique subtree and the contents hash portion represents a subtree hash value.

11. The computer program product of claim 10, wherein the path portion representing the relaxed XPath definition indicates a path definition for a corresponding subtree portion of the DOM that contains independent states, and wherein multiple subtrees can exist in a single DOM tree with identical relaxed XPaths.

12. The computer program product of claim 10, wherein the value of the state identifier are unique and distinguished from one another.

13. An apparatus for identifying client states, the apparatus comprising:
a communications fabric;
a memory connected to the communications fabric, wherein the memory contains computer executable program code; and
a processor unit connected to the communications fabric, wherein the processor unit executes the computer executable program code to direct the apparatus to:
receive a set of paths representative of a document object model (DOM) associated with a web page of a rich Internet application, wherein the receiving further comprises:
initializing a list of all paths as empty;
identifying using a selected predetermined crawling strategy Event X as a next event to execute;
capturing a representation of an html_before execution of the Event X;
executing the event X;
capturing a representation of an html_after execution of the Event X;
identifying a Delta X as a difference between the html_before execution of the event X and the html_after execution of the Event X;
defining Path X as a relaxed XPath of Delta X; and
responsive to a determination Path X does not exist in the list of all paths, adding Path X to the list of all paths;

define a set of current states as the set of current states determined for Delta X;
for each path in the set of paths received by a processor:
  extract a subtree, as Subtree X, for a current path;
  traverse known sub-paths under the current path and deleting corresponding subtrees from Subtree X;
  read contents of and determining states of Subtree X to form a State X; and
  add the State X to the set of current states;
associate the set of current states with Event X as possible destination states of the Event X; and
responsive to a determination no more paths exist, return the set of current states of the rich Internet application.

14. The apparatus of claim 13, wherein the processor unit further executes the computer executable program code to direct the apparatus to:
determine whether there are more events in the crawling strategy to execute; and
responsive to a determination there are more events in the crawling strategy to execute, return to identify using a selected predetermined crawling strategy Event X as a next event to execute.

15. The apparatus of claim 13, wherein the set of paths representative of a document object model (DOM) associated with a web page of a rich Internet application is a data structure comprising the list of all paths.

16. The apparatus of claim 15, wherein the data structure comprising the list of all paths further comprises:
a set of entries, wherein each entry in the set of entries comprises a tuple representative of at least a path portion, a state identifier portion and a contents hash portion, wherein the path portion comprises a relaxed XPath definition, the state identifier portion indicates a value of an assigned state identifier for a unique subtree and the contents hash portion represents a subtree hash value.

17. The apparatus of claim 16, wherein the path portion representing the relaxed XPath definition indicates a path definition for a corresponding subtree portion of the DOM that contains independent states, and wherein multiple subtrees can exist in a single DOM tree with identical relaxed XPaths.

* * * * *